Dec. 19, 1967     C. G. SIMONS     3,358,839

IN-LINE FILTER ELEMENT ASSEMBLING MEANS

Filed March 1, 1965

INVENTOR.
CLIFFORD G. SIMONS
BY
Andrus & Starke
Attorneys 3,358,839
IN-LINE FILTER ELEMENT ASSEMBLING
MEANS
Clifford G. Simons, Delavan, Wis., assignor, by mesne assignments, to Sta-Rite Industries, Inc., Delavan, Wis., a corporation of Wisconsin
Filed Mar. 1, 1965, Ser. No. 436,253
3 Claims. (Cl. 210—232)

ABSTRACT OF THE DISCLOSURE

An in-line filter assembly having a body with a tapered inner surface at one end; a hollow, tapered, flanged plug inserted into said one end of said body and sealing the open end of a flexible element therebetween; and a cap clamping the flange of the plug into sealing engagement with the outer annular edge of the body; said flexible filter element having a support therein, said support being inserted into the hollow portion of said plug.

---

This invention relates to a filter and more particularly to an in-line filter for a milking system.

In a milking system the milk is normally filtered prior to being discharged into the bulk storage tank. With a pipeline system in which milk is conducted from the milking machines through a pipeline to the bulk storage tank, an in-line filter is generally used in the pipeline. When using a transfer milking system in which the milk from each milker is manually dumped into a movable transfer station and is then pumped through a hose or pipe to the bulk storage tank, a disc type filter is usually employed in the transfer station. While a disc filter provides a relatively large surface area for filtering, it does have a drawback in that when it clogs, the milk will stand on the filter and it is necessary to manually remove the milk is order to replace the filter.

The present invention is directed to an improved in-line filter for a milking system which can be used with either a pipeline milking system or with a transfer system. The filter of the invention includes a tubular, transparent body which has a reduced inlet end connected to the pipeline or hose. A generally cylindrical filter sock is located within the body and the sock has a closed end which faces upstream toward the inlet end of the body. To prevent collapse of the sock, a porous reinforcing support, such as a coil spring, is located within the sock and the downstream end of the spring is held within a resilient plug located within the end of the body.

To seal the stock to the body, the open end of the sock is held against a tapered end portion of the body by a tapered resilient plug which is sealed to the body by an outlet cap which engages the body by a bayonet-type connection.

The milk enters the filter through the inlet end, passes inwardly through the sock and is discharged through an outlet opening in the cap.

The present invention provides an in-line filter which has an improved filtering action and provides a large filtering surface with a small overall dimension.

The filtering sock or sleeve can be readily replaced from the body by merely unthreading the cap with a 45° turn and removing the filter sock and the spring or support from the body. With this type of connection it is not necessary to detach the hoses or pipes from either the inlet end of the body or the cap in order to remove and replace the filtering sock.

As the tubular body is formed of a transparent material, the filter sock is visible and it can be readily determined when the filter sock is dirty and needs replacement. In addition, the transparent body enables the operator to continually observe the milk flow to determine whether there is any blood or foreign matter in the milk.

Other objects and advantages will appear in the course of the following description.

The drawings illustrate the best mode presently contemplated of carrying out the invention.

Figure 1:
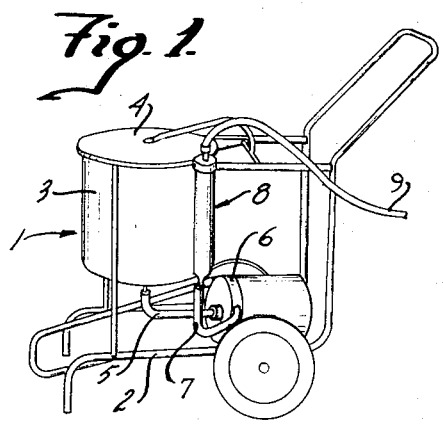
FIG. 1 is a side elevation of a portable pumping station employing the in-line filter of the invention.

The drawings illustrate a portable pumping station 1 including a movable frame 2 which carries a milk receiving tub or receptacle 3. The upper end of the tub 3 is open and is enclosed by a hinged lid 4.

Milk from each individual milker is dumped into the tub 3 and the milk is automatically pumped from the tub 3 through an outlet 5 by a pump 6 when the level of milk in the tub rises to a preset level. The outlet side of the pump 6 is attached to a hose 7 which in turn is connected to the lower end of an in-line filter 8. The upper or discharge end of the filter 8 is connected to a hose 9 which leads to a bulk storage tank, not shown.

The filter 8 includes a generally tubular body 10 which is preferably formed of a transparent material such as plastic, glass or the like. The inlet or lower end 11 of the body 10 is provided with a reduced cross section and the end 11 is inserted within the hose 7.

Located within the body 10 is a tubular filtering sock or sleeve 12. The upstream end 13 of the sock is closed off while the downstream end of the sock 12 is open. The filter sock can be formed of any conventional filtering material such as flannel, paper stock or the like.

To prevent collapse of the filter sock 12 a coil spring 15 is located within the sock. The upper end of the coil spring 15 is press fitted within the central opening in a resilient plug 16 which is located within the upper end of of the body 10. The plug 16 is formed of a resilient material, such as rubber or the like, and is capable of deforming under pressure.

Figure 3:
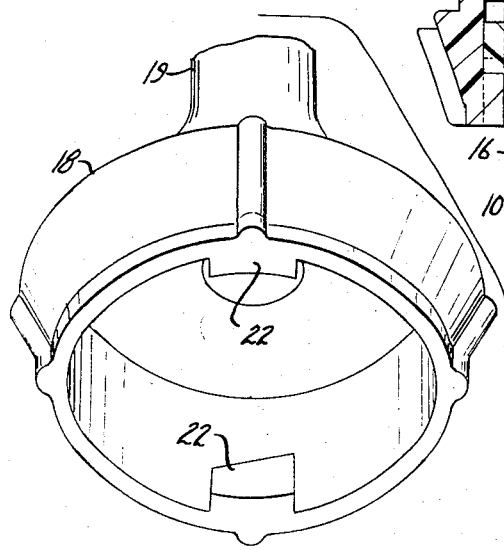
FIG. 3 is an enlarged fragmentary vertical section showing the discharge end of the filter.
Figure 4:
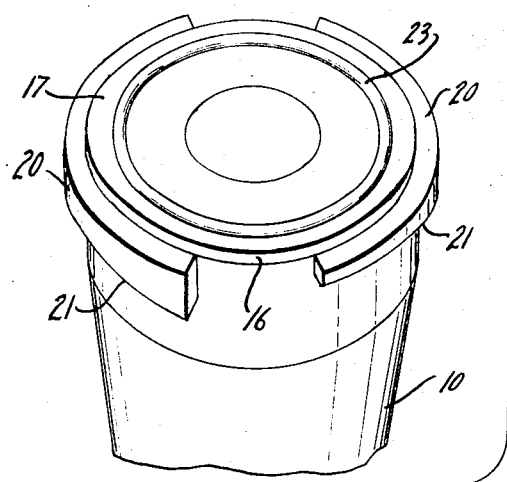
FIG. 4 is an exploded perspective view of the cap and filter body.
Figure 2:
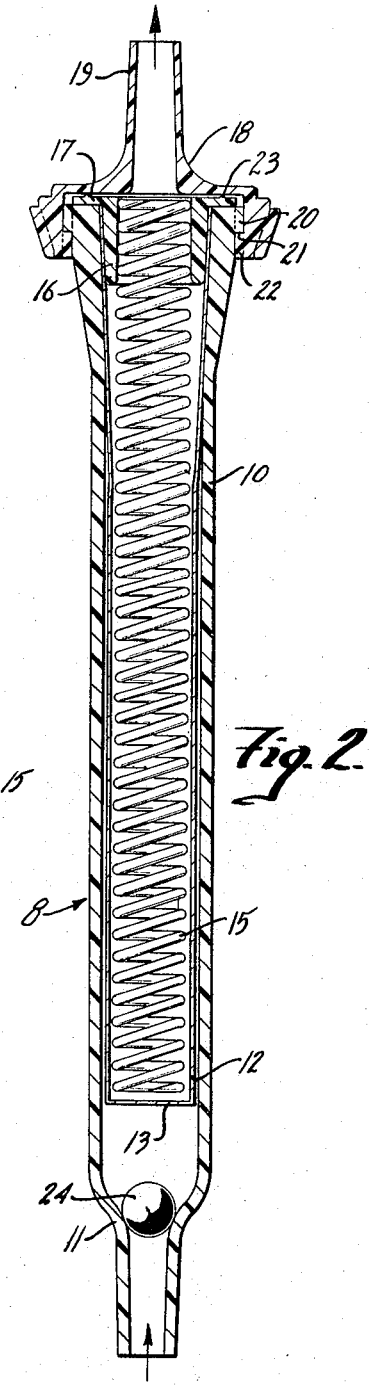
FIG. 2 is a vertical section of the filter of the invention.

Plug 16 is provided with an outwardly extending flange 17 which bears against the upper end of the body 10. As shown in FIG. 3, the upper end of the filter sock 12 is sealed between the end of the body 10 and the plug 16.

The open upper end of the body 10 is enclosed by a cap 18 which is provided with an upwardly extending nipple 19. The nipple 19 is inserted within the hose 9. Cap 18 is secured to the body 10 by a bayonet-type of connection. In this regard a pair of outwardly extending ridges 20 is formed on the outer surface of the body 10 adjacent the upper end of the body. The lower surfaces of the ridges 20 are inclined or tapered, as indicated by 21.

The interior surface of the cap 18 is provided with a pair of ridges 22 which rides along the cam surfaces 21 as the cap is rotated to provide a wedging or cam action which tends to draw the cap and body axially toward each other and provide a tight seal.

As best shown in FIG. 3, the upper end of plug 16 is formed with an annular sealing ridge 23 and as the cap 18 is drawn toward the body the ridge 23 is flattened to provide a secondary seal between the members.

When the in-line filter is used with a portable pumping station employing a pump to discharge the milk from the station to the bulk storage tank, a ball check valve 24 is located in the upstream end 11 of the body and serves to prevent loss of vacuum in the system. In other systems where the loss of vacuum is not a problem, the bell check valve 24 can be eliminated. When milk is flowing through the filter, the spring 15 prevents the ball valve 24 from being carried to the upper end of the body.

The in-line filter of the invention incorporating the cylindrical filter sock 12 provides an effective filtering action and also provides a large filtering surface area with a minimum external dimension. As the tubular body 10 is formed of a transparent material, the filtering sock 12 is readily visible and can be replaced when dirty or clogged.

When removing and replacing the filter sock 12 it is not necessary to detach or remove the hoses 7 and 9. To change the sock, the cap 19 is merely removed from the body 10 and the filtering assembly, which includes the filter sock 12, the spring 15 and the plug 16, is removed from the body 10. The sock 12 can then be removed and replaced with a clean sock and the entire assembly reinserted within the body.

While the above description has been directed to the use of the filter in connection with a milk transfer system, it is contemplated that the filter can be used in any in-line application where it is desired to filter milk or other liquids.

Various modes of carrying out the invention are contemplated as being within the scope of the following claims particularly pointing out and distinctly claiming the subject matter which is regarded as the invention.

I claim:

1. An in-line filter for a milking system, comprising a transparent tubular body having openings in opposite ends to be connected to a milk line, a tubular filtering sleeve disposed within the body, said sleeve formed of a flexible filtering material and having a closed end facing a first end of the body and having an open end facing the second end of the body, the inner surface of said second end of the body being tapered inwardly, a porous support disposed within the sleeve, a resilient plug disposed within the second end of the body and having an outer tapered surface to wedge against the inner tapered surface of said second end and having central passage therein communicating with the interior of said sleeve, an end of said support being mounted within the central passage of said plug and the open end of said sleeve being sealed between the tapered surfaces of the plug and said second end of the body, said plug having a flange extending radially outward and disposed in bearing engagement with the outer annular edge of the second end of the body, and a cap removably engaged with the body and being rotatable between a locked and unlocked position, said cap having a surface bearing against the flange of said plug to force said flange against the second end of the body when the cap is in the locked position and provide a seal, said locked and unlocked positions being less than 90° apart.

2. The filter of claim 1, wherein said cap and said body have complementary wedging surfaces disposed to draw the cap and body axially toward each other as said cap is rotated to the locked position.

3. The filter of claim 1, and including an annular rib disposed on the flange of said plug and facing said cap, said surface of the cap bearing against said rib when the cap is moved to the locked position to provide a fluid seal between the members.

References Cited

UNITED STATES PATENTS

| | | | |
|---|---|---|---|
| 568,787 | 10/1896 | Oster | 210—448 |
| 1,292,737 | 1/1919 | Endreson | 210—136 X |
| 2,145,047 | 1/1939 | Goldkamp | 210—448 X |
| 2,186,987 | 1/1940 | Nesset | 210—453 X |
| 2,376,739 | 5/1945 | Walker | 210—448 X |
| 2,982,415 | 5/1961 | Contreras | 210—448 X |
| 3,000,504 | 9/1961 | Pfeiffer | 210—448 X |

FOREIGN PATENTS

| | | |
|---|---|---|
| 206,217 | 11/1959 | Austria. |
| 527,501 | 4/1954 | Belgium. |

F. SPEAR, *Assistant Examiner.*

REUBEN FRIEDMAN, *Primary Examiner.*